(12) United States Patent
Manousakis

(10) Patent No.: US 10,768,544 B2
(45) Date of Patent: Sep. 8, 2020

(54) PRINT COLOR STABILITY

(71) Applicant: HP Indigo B.V., Amstelveen (NL)

(72) Inventor: Stylianos Manousakis, Sant Cugat del Valles (ES)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/342,244

(22) PCT Filed: Oct. 21, 2016

(86) PCT No.: PCT/EP2016/075421
§ 371 (c)(1),
(2) Date: Apr. 16, 2019

(87) PCT Pub. No.: WO2018/072850
PCT Pub. Date: Apr. 26, 2018

(65) Prior Publication Data
US 2019/0324378 A1 Oct. 24, 2019

(51) Int. Cl.
| | | |
|---|---|---|
| G03G 15/01 | (2006.01) | |
| B41F 7/00 | (2006.01) | |
| G03G 15/16 | (2006.01) | |
| B41F 9/02 | (2006.01) | |
| B41F 7/06 | (2006.01) | |
| B41F 13/193 | (2006.01) | |

(52) U.S. Cl.
CPC .......... *G03G 15/0147* (2013.01); *B41F 7/06* (2013.01); *B41F 9/021* (2013.01); *B41F 13/193* (2013.01); *G03G 15/0131* (2013.01); *G03G 15/1605* (2013.01); *G03G 2215/0174* (2013.01)

(58) Field of Classification Search
CPC ............... G03G 13/01; G03G 15/0131; G03G 15/1605; G03G 15/5083; G03G 2215/0174; G03G 2215/0106; G03G 2215/017; B41F 7/06; B41F 9/021; B41F 13/193; G06F 3/1208; G06F 3/1247; G06F 3/1282; G06F 3/125; G06F 3/1252
USPC ............................................. 399/39, 40, 302
See application file for complete search history.

(56) References Cited

U.S. PATENT DOCUMENTS 5,839,039 A * 11/1998 Yamada .............. G03G 15/0131
399/298
6,263,174 B1 * 7/2001 Fuchiwaki ............. G03G 15/50
399/302

(Continued)

FOREIGN PATENT DOCUMENTS

| EP | 0685773 A1 | 12/1995 |
| JP | 63109462 A * | 5/1988 |
| WO | WO-2016141990 | 9/2016 |

OTHER PUBLICATIONS

Tagansky B., HP-Indigo Technology and its Application to Photo Printing, Dec. 21, 2011.

*Primary Examiner* — Robert B Beatty
(74) *Attorney, Agent, or Firm* — HP Inc. Patent Department

(57) ABSTRACT

An apparatus and method for use in generating a print job for an offset printing apparatus. The method comprising determining a print job to be printed on the offset printer comprises an odd number of separations, and in response to determining that the print job comprises an odd number of separations, alternating a print order of at least two separations between odd and even pages of the print job.

14 Claims, 4 Drawing Sheets

(56) References Cited

U.S. PATENT DOCUMENTS

| | | | |
|---|---|---|---|
| 7,031,631 B2* | 4/2006 | Sato | G03G 15/1625 |
| | | | 399/302 |
| 9,377,720 B2* | 6/2016 | Lior | G03G 15/10 |
| 10,191,416 B2* | 1/2019 | Portnoy | G03G 15/101 |
| 2008/0181680 A1* | 7/2008 | Peleg | G03G 15/0131 |
| | | | 399/302 |
| 2010/0092215 A1 | 4/2010 | Veregin et al. | |
| 2013/0108326 A1 | 5/2013 | Iqawa | |
| 2014/0283699 A1 | 9/2014 | Peleg et al. | |
| 2014/0322380 A1 | 10/2014 | Tombs | |
| 2018/0017885 A1* | 1/2018 | Portnoy | G03G 15/0173 |
| 2019/0033744 A1* | 1/2019 | Portnoy | G03G 15/101 |

* cited by examiner

| PAGE | 1 | | | | 2 | | | |
|---|---|---|---|---|---|---|---|---|
| PIP Side | 1 | 2 | 1 | 2 | 1 | 2 | 1 | 2 |
| Separation | Y | M | C | K | Y | M | C | K |
| IMP Rotations | 1 | 2 | 3 | 4 | 5 | 6 | 7 | 8 |

Figure 3a

| PAGE | 1 | | | 2 | | |
|---|---|---|---|---|---|---|
| PIP Side | 1 | 2 | 1 | 2 | 1 | 2 |
| Separation | Y | M | C | Y | M | C |
| IMP Rotations | 1 | 2 | 3 | 4 | 5 | 6 |

Figure 3b

| PAGE | 1 | | | | 2 | | | |
|---|---|---|---|---|---|---|---|---|
| PIP Side | 1 | 2 | 1 | 2 | 1 | 2 | 1 | 2 |
| Separation | Y | M | C | Null | Y | M | C | Null |
| IMP Rotations | 1 | 2 | 3 | 4 | 5 | 6 | 7 | 8 |

Figure 3c

| PAGE | 1 | | | 2 | | |
|---|---|---|---|---|---|---|
| PIP Side | 1 | 2 | 1 | 2 | 1 | 2 |
| Separation | Y | M | C | Y | C | M |
| IMP Rotations | 1 | 2 | 3 | 4 | 5 | 6 |

Figure 3d

PRINT COLOR STABILITY

BACKGROUND

Modern printing apparatus, for example offset printers, allow reproduction of color images on print media that can be used for brochures, books, leaflets, etc. Significant effort has been spent in improving the accuracy of the color images reproduced on the print media, and it remains an active area of research.

When printing a number of consecutive pages or documents it is generally preferable if the color reproduction on each page is similar, i.e. that color shifts between pages are avoided or limited.

BRIEF INTRODUCTION OF THE DRAWINGS

Examples of the present invention are further described hereinafter by way of example only with reference to the accompanying drawings, in which:

FIG. 3a is a table illustrating conventional CMYK separation print order in an offset printer;

FIG. 3b is a table illustrating a CMY separation print order in an offset printer;

FIG. 3c is a table illustrating a modified CMY separation print order including NULL cycles in an offset printer;

FIG. 3d is a table illustrating a modified CMY separation print order in an offset printer according to some examples.

DETAILED DESCRIPTION OF AN EXAMPLE

Examples provide a way of processing a print job for an offset printing apparatus to improve color stability of the printed images.

Figure 1:
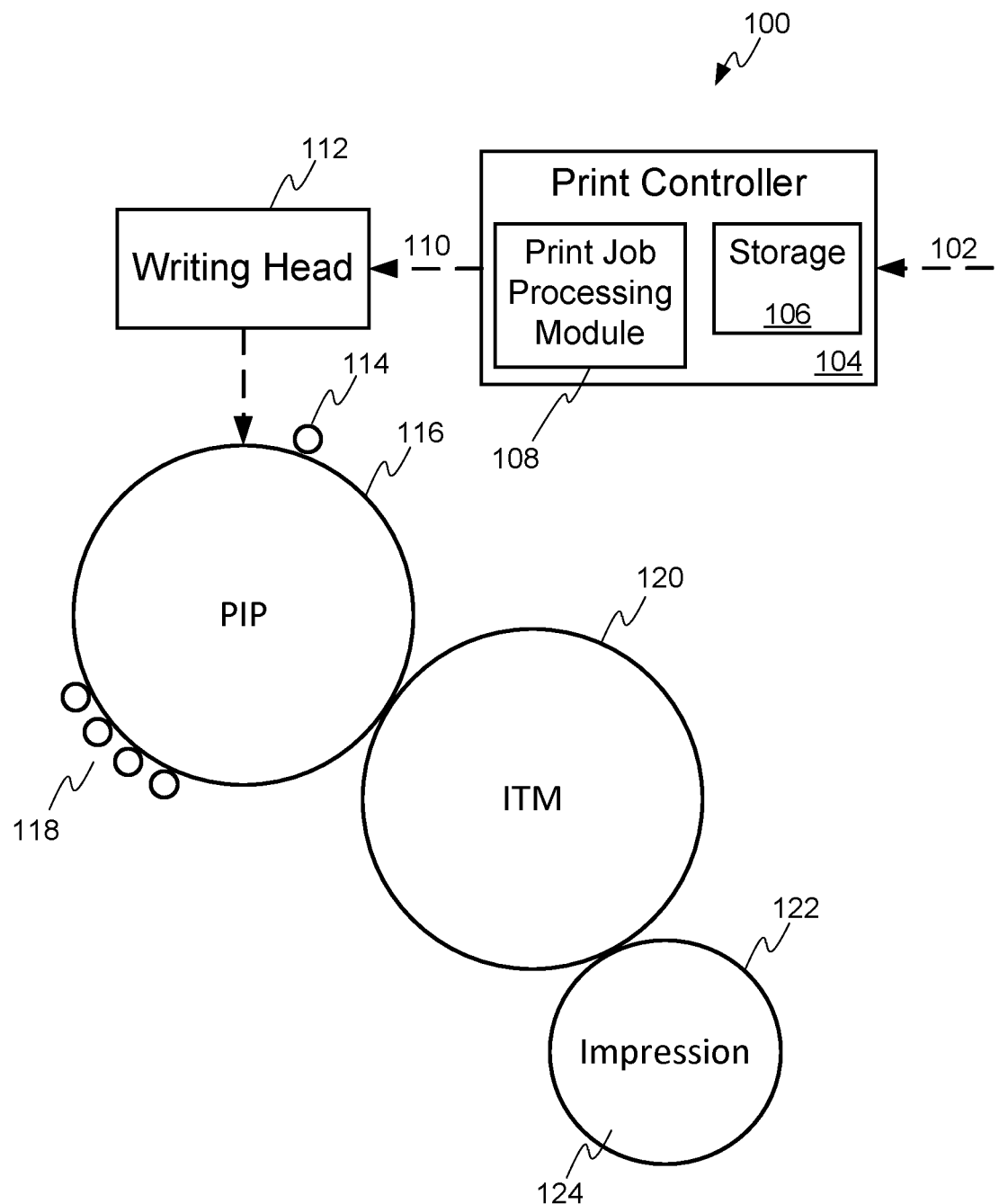
FIG. 1 is a block diagram of an offset printing engine according to some examples.

FIG. 1 is a block diagram showing an example of an offset print engine 100, or offset printer, according to some examples. The surface of photo imaging plate (PIP) 116 receives a uniform electric charge by operation of a charging unit 114. In the following examples, the PIP is described as a photoconductive drum 116, but other arrangements are possible, such as a photoconductive belt.

Image data 110 is provided to writing head 112 for writing the print data to the PIP 116, for example by using laser elements within the write head 112 to selectively illuminate the surface of the photoconductive drum 116, such that areas exposed to the illumination are discharged. This results in an electrostatic image (a so-called latent image) being produced on the PIP drum 116, the electrostatic image corresponding with one color separation of the image to be printed. The latent image is developed by developing module 118, e.g. Binary Ink Developers, applying liquid toner to the surface of the PIP drum 116. The toner selectively adheres to the surface of the PIP drum 116, for example adhering to the discharged portions of the surface of the PIP drum 116 (and not to charged portions), to form a toner image on the PIP drum 116. The return image is then transferred to an intermediate transfer media (ITM) roller 120, and toner remaining on the PIP drum is removed. Where different types of toner are used in the same image, for example where each toner is a different color in color printing, multiple toner images may be applied to the roller 120 in successive rotations of the drum 116.

The intermediate transfer roller 120 may heat the toner image that is received from the PIP drum 116 to evaporate a carrier of the toner. The image is then transferred from the intermediate transfer roller 120 to a print medium 122 wrapped around an impression drum 124.

A print controller 104 may be provided to control the various components of the print engine 100. The control section may include one or more processors, volatile and are nonvolatile memory for storing instructions to be executed by the processors and data for use by the processors in. In some examples, the control section 104 may be distributed between the various components of the print engine 100.

In particular, the print controller 104 may comprise a print job processing module 108 and storage 106. According to examples, the print controller 104 receives a print job 102 and processes the print job 102 using the print job processing module to improve the color stability between odd and even pages of the print job and to generate the image data 110 to be provided to the writing head 112. Information relating to the processed print job 102 may then be stored in storage 106.

The impression drum 124 may be of a different circumference to the photoconductive drum 116 and intermediate transfer drum 120, for example the PIP 116 and ITM 120 drums may have a circumference of twice that of the impression drum 124. Thus, one turn of the PIP and ITM drums equals two turns of the impression drum 124 and therefore the PIP and ITM drums may be considered as being divided into two halves, with each half corresponding to one rotation of the impression drum 124, which is called one separation.

When printing an image using a CMYK process, four separations are printed, leading to the impression drum 124 rotating four times and the PIP 116 and ITM 120 drums rotating twice. In each rotation of the impression drum 124, one separation is transferred to the print medium.

Figure 2:
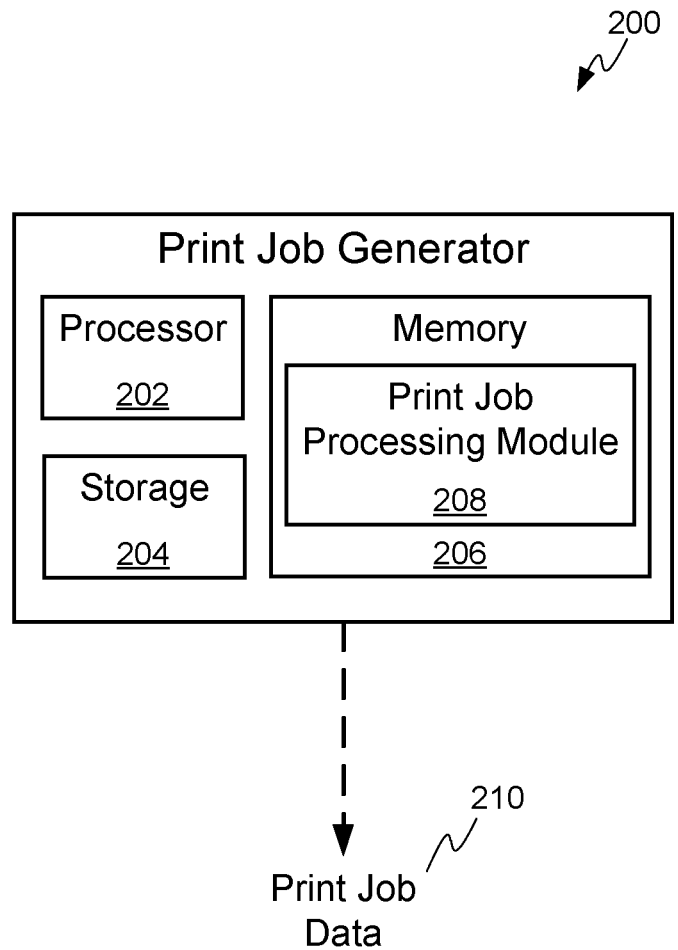
FIG. 2 illustrates an print job generator apparatus according to some examples.

FIG. 2 illustrates a block diagram of an apparatus 200 for generating a print job according to some examples. The print job generator apparatus 200 comprises a processor 202 coupled to storage 204 and memory 208. The memory may comprise a print job processing module 208 operable to process a print job to improve color stability between odd and even pages of the print job, and to output the processed print job data 210 for use in an offset printer.

In some examples, the apparatus 200 of FIG. 2 may be used to implement the print controller 104 within the offset printer 100 of FIG. 1. According to some examples, the print job generator apparatus 200 may be implemented external to an offset printer and provide processed print job data 210 for use in a printing apparatus.

FIG. 3a is a table showing an example of a four color job (CMYK) sequence for two consecutive pages of a print job. For the first page, comprising four rotations of the impression drum 124, the yellow (Y) and cyan (C) separations are formed on the first half of the PIP drum while the magenta (M) and black, (K) separations are formed on the second half of the PIP drum. For the second page, as illustrated in FIG. 3a, the separations are formed on the same halves of the PIP drum as for the first page.

However, when printing an image using an odd number of separations, for example a CMYK+Spot color or enhanced productivity mode (EPM) process in which no black separation is used, the separations for a second page may not be formed using the same halves of the PIP drum 116 as used for the first page.

FIG. 3b is a table showing an example of a three color (CMY) sequence for two consecutive pages. As can be seen in FIG. 3b, for a first page, the Y and C separations are formed on the first half of the PIP while the M separation is formed on the second half of the PIP drum. In contrast, for the second page, this is reversed with the Y and C separations formed on the second half of the PIP drum and the M separation formed on the first half.

Different sides of the PIP drum may provide slightly different performance, for example due to uneven wear, leading to slight differences in the separation reproduction between the two sides. Thus, this alternating between first and second halves of the PIP drum to form the different separations for odd and even pages of the print job may lead to a repeated color shift between the odd and even pages. Such color shifts may be undesirable and lead to dissatisfaction in the printing apparatus by the user.

FIG. 3c is a table showing one approach to reduce or eliminate such color shifts by adding a null cycle to each page of the print job to reset the order of the separations for each page. Thus, the print cycle for the first page includes Y and C separations using the first half of the PIP drum, an M separation using the second side of the PIP drum, and a Null cycle associated with the second side of the PIP. The second page is then printed with the separations and a Null cycle associated with the same side of the PIP drum as for the first page.

While the approach illustrated in FIG. 3c address the color shifts between odd and even pages of the print job, the introduction of Null cycles adds a delay equal to one separation print time for each page of the print job. In the case of the three color print job, this may extend the time taken to complete the print job by 33%.

FIG. 3d is a table illustrating a modified approach to reduce color shifts between odd and even pages according to some examples. As shown in FIG. 3d, a print job may be performed by forming a first page with Y and C separations formed using the first side of the PIP drum and the M separation formed using the second side of the PIP drum.

For the second page of the print job, the yellow separation is formed using the second side of the PIP drum. However, the print order of the C and M separations is reversed such that the C separation is formed on the first side of the PIP drum, as for the first page, and the M separation is formed using the second side of the PIP drum.

Thus, while the yellow separation is printed on different PIP drum sides for odd and even pages, the cyan and magenta separations are printed on the same side of the PIP drum for both odd and even pages. Thus, the overall color difference between odd and even pages printed by the offset printer is reduced. Furthermore, as the human eye is generally less sensitive to the yellow used in printing the image, the perceived color accuracy may be significantly improved.

While the above example has been described for a three color print job using CYM color separations, the described method may be applied to any situation in which an odd number of separations are to be printed. By changing the print order of certain color separations between odd and even pages of the print job overall color consistency may be improved without introducing delays into the printing process.

According to examples, the print processing module 102 of FIG. 1, or the print job generator 200 of FIG. 2 may analyze a print job 102 that has been received and if it is determined that the print job 102 comprises an odd number of separations assign certain color separations to be printed by a particular side of the PIP drum for both odd and even pages of the print job. This may be achieved by alternating a print order of at least two separations between odd and even pages of the print job.

Once the color separations have been assigned to a side of the PIP drum 116, the PIP side assignment may be stored in a file history in storage 106 or storage 204, Thus, if the same print job 102 is to be reprinted at a future date on the same printing apparatus 100, the PIP side assignment may be retrieved from the file history in storage 106 and the separations will follow the same PIP side assignments as the original print job to limit color shifts between reprints of the same print job.

Figure 4:
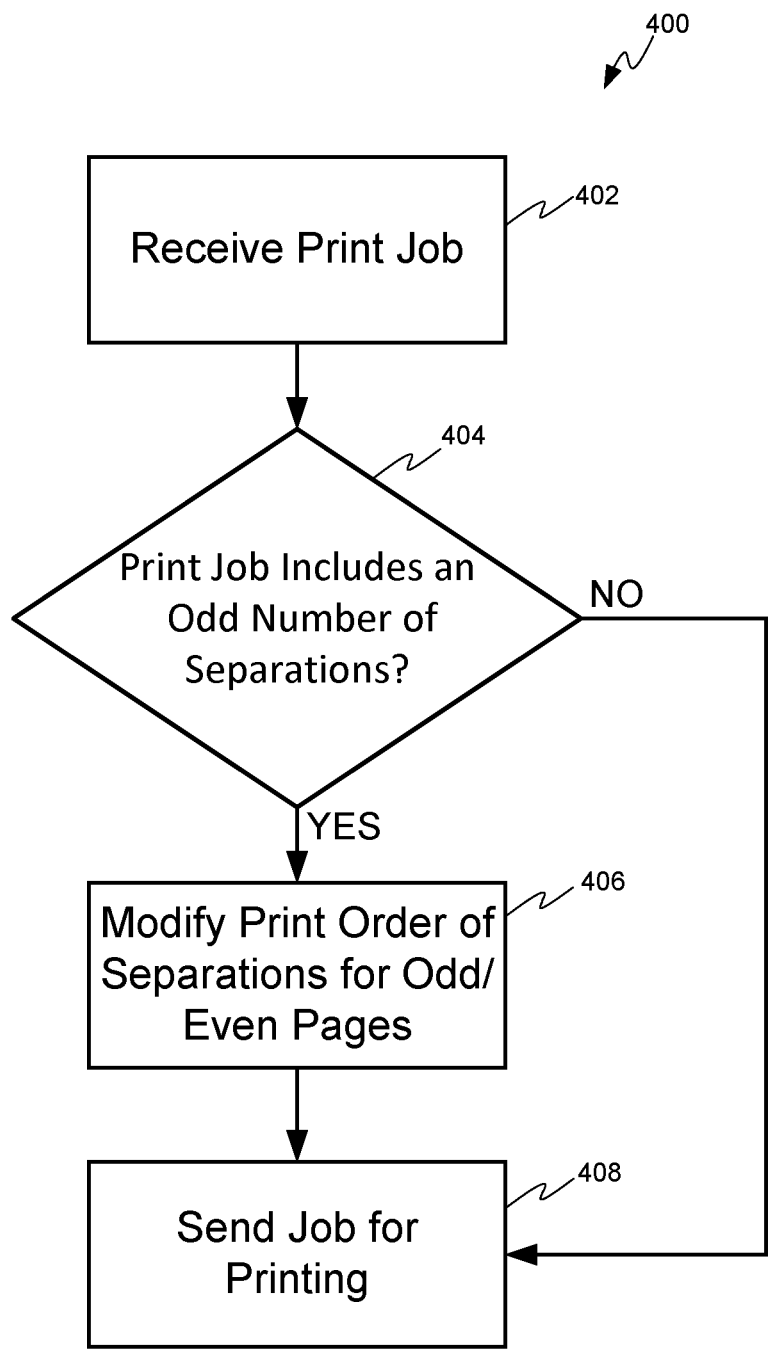
FIG. 4 illustrates a method of processing a print job to improve color stability of the printed images according to some examples.

FIG. 4 illustrates a method of processing a print job according to examples that may be implemented on a printing apparatus 100 as shown in FIG. 1 or by print job generator 200 of FIG. 2. According to the method 400 of FIG. 4, in a first stage 402 the print job is received at the printing apparatus 100 or received or generated by print job generator 200 of FIG. 2. A determination 404 is then made whether the print job comprises an odd number of separations to be printed to the print media. If not, the print job can be sent for printing 408 as normal. However, if it is determined that the print job does include an odd number of separations, the print job is modified 406 to alternate the print order of at least two of the separations between odd and even pages of the print job.

In some examples, print jobs may comprise sections using an even number of separations, while other sections use an odd number. In this case, only those portions of the print job using an odd number of separations may be modified as described above, while those portions using an even number of separation may remain unchanged in the print job sent for printing.

In the case where the print job comprises CMY separations, the print job may be modified to alternate the print order of the cyan and magenta separations between the odd and even pages of the print job such that the cyan and magenta separations are always formed on the same respective sides of the PIP drum.

In some examples, modifying the print job is achieved by tagging the print job data 210 with an indication of the print order for the separations of the print job, such as PIP side assignment information, that can be interpreted by the printing apparatus 100 when printing the print job. The indication of the print order may then be stored in storage 106 or storage 204 and retrieved in the case of a reprint of the same print job to ensure color consistency when the same print job is printed again.

In some examples, the described method may be performed by an apparatus 200 generating the print job, for example as part of a desktop publishing application that determines when an odd number of separations is to be used and provides appropriate PIP side assignment information to the printing apparatus 100 alongside the print job 102.

Examples described herein may be implemented into a printing apparatus using any suitably configured hardware and/or software. For example, printer control module 108 may comprise one or more processing resources operable to execute instructions stored in a memory and configured to implement the calibration method described above.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of generating a print job for an offset printer, the method comprising:
   determining a print job to be printed on the offset printer comprises an odd number of color separations; and
   in response to determining that the print job comprises an odd number of color separations, alternating a print order of at least two color separations between odd and even pages of the print job.

2. The method of claim 1, wherein the offset printer comprises a printing imaging plate (PIP) and wherein alternating a print order of at least two color separations between odd and even pages of the print job comprises modifying the print order of a first color separation and a second color separation such that the first color separation is formed on a same portion of the PIP for both odd and even pages of the print job.

3. The method of claim 1, wherein the print job comprises three color separations.

4. The method of claim 3, wherein the three color separations comprise a yellow separation; a magenta separation; and a cyan separation; and wherein alternating a print order to at least two color separations between odd and even pages of the print job comprises swapping the print order of the magenta separation and the cyan separation between odd and even pages of the print job.

5. The method of claim 1 comprising generating a print job file, wherein the print job file is tagged with an indication of the print order for the color separations of the print job.

6. The method of claim 5, further comprising storing the indication of the print order for the color separations of the print job and applying the stored indication of the print order to a reprint of the print job.

7. The method of claim 1, the method further comprising transmitting the modified print job to an offset printer for printing on print media.

8. An apparatus for generating a print job for an offset printer, the apparatus comprising:
   a processor;
   a memory coupled to the processor and comprising instructions, when executed by the processor, to cause the apparatus to:
      determine a print job to be printed on the offset printer comprises an odd number of color separations; and
      in response to determining that the print job comprises an odd number of color separations, alternate a print order of at least two color separations between odd and even pages of the print job.

9. The apparatus of claim 8, the instructions further to cause the apparatus to generate a print job file for transmission to an offset printer, wherein the print job file is tagged with an indication of the print order for the color separations of the print job.

10. The apparatus of claim 9, the instructions further to cause the apparatus to store the indication of the print order for the color separations of the print job and to tag a print job file for a reprint of the print job with the stored indication.

11. The apparatus of claim 8, wherein the odd number of color separations comprise a yellow separation; a magenta separation; and a cyan separation; and wherein alternating a print order to at least two color separations between odd and even pages of the print job comprises swapping the print order of the magenta separation and the cyan separation between odd and even pages of the print job.

12. The apparatus of claim 8 wherein the offset printer comprises a printing imaging plate (PIP) and wherein alternating a print order of at least two color separations between odd and even pages of the print job comprises modifying the print order of a first color separation and a second color separation such that the first color separation is formed on a same portion of the PIP for both odd and even pages of the print job.

13. An offset printer comprising:
   a printer imaging plate (PIP) drum;
   an impression drum having a circumference half that of the impression drum;
   a processor; and
   a memory coupled to the processor and comprising instructions, when executed by the processor, to cause the offset printer to:
      determine a print job to be printed on the offset printer comprises an odd number of color separations; and
      in response to determining that the print job comprises an odd number of color separations, alternate a print order of at least two color separations between odd and even pages of the print job.

14. The offset printer of claim 13, wherein alternating a print order of at least two color separations between odd and even pages of the print job comprises modifying the print order of a first color separation and a second color separation such that the first separation is formed on a same portion of the PIP for both odd and even pages of the print job.

* * * * *